United States Patent [19]

Mackiewicz

[11] Patent Number: 4,623,961
[45] Date of Patent: Nov. 18, 1986

[54] PROGRAMMABLE CONTROLLER HAVING AUTOMATIC CONTACT LINE SOLVING

[75] Inventor: Ralph E. Mackiewicz, Madison Heights, Mich.

[73] Assignee: Westinghouse Electric Corp., Pittsburgh, Pa.

[21] Appl. No.: 587,092

[22] Filed: Mar. 7, 1984

[51] Int. Cl.[4] ......................... G06F 15/46; G06F 9/06
[52] U.S. Cl. .................................... 364/147; 364/900
[58] Field of Search ..................... 364/136, 140-147, 364/200 MS File, 900 MS File

[56] References Cited

U.S. PATENT DOCUMENTS

| 4,058,711 | 11/1977 | Onderlin et al. | 364/147 X |
| 4,165,534 | 8/1979 | Dummermuth et al. | 364/136 X |
| 4,227,247 | 10/1980 | Kintner | 364/147 X |
| 4,247,901 | 1/1981 | Martin et al. | 364/147 X |
| 4,303,090 | 12/1981 | Seipp | 364/900 |

Primary Examiner—Joseph Ruggiero
Attorney, Agent, or Firm—M. J. Moran

[57] ABSTRACT

A programmable controller having a processor and a dual stack line solver for solving a reference relay ladder diagram wherein the dual stack line solver is used for solving the contact type elements found in the rungs of the reference relay ladder diagram, with the noncontact type elements being directed to the processor for solution.

15 Claims, 13 Drawing Figures

CONTACT ATTRIBUTES

| OPEN | UP | RETURN | NO/NC | SYMBOL |
|------|----|--------|-------|--------|
| —    | —  | X      | X  —  |        |
| —    | X  | —      | X  —  |        |
| —    | X  | X      | X  —  |        |
| X    | —  | —      | X  —  |        |
| X    | —  | X      | X  —  |        |
| X    | X  | —      | X  —  |        |
| X    | X  | X      | X  —  |        |
| —    | —  | —      | X  —  |        |
| —    | —  | X      | —  X  |        |
| —    | X  | —      | —  X  |        |
| —    | X  | X      | —  X  |        |
| X    | —  | —      | —  X  |        |
| X    | —  | X      | —  X  |        |
| X    | X  | —      | —  X  |        |
| X    | X  | X      | —  X  |        |
| —    | —  | —      | —  X  |        |

X = ATTRIBUTE PRESENT
— = ATTRIBUTE ABSENT

FIG. 6

PROGRAMMABLE CONTROLLER HAVING AUTOMATIC CONTACT LINE SOLVING

BACKGROUND OF THE INVENTION

The subject matter of this invention relates generally to programmable controllers and especially to programmable controllers utilizing dual stack line solvers.

Relay logic ladder diagrams include rungs of innerconnected switches, relay contacts, and output devices such as relay coils disposed in rows between two conducting rails of a power supply. The principles of relay logic are utilized for controlling electromechanical devices in the ladder diagram. Using art in existence prior to the advent of the relay line solver technology, relays, switches, and other devices of the logic ladders are hard wired and strung together between the conducting rails of the power supply. The various switches and contacts of the relay logic ladder are in various states of conduction or nonconduction depending on the disposition of mechanical devices such as floats or temperature sensitive elements or depending on the disposition of output devices such as relay coils to which they are interlinked electrically or mechanically. In the event that appropriate contacts or switches are in a closed state in a given rung of the ladder, the output device using a relay coil controlled by the rung will be actuated. The actuation will cause certain actions, external or internal, to the relay ladder to occur.

With the advent of the computer technology the reference ladder diagram, which is a graphical representation of the relay ladder diagram, is simulated with the programmable controller. This eliminates the bulky and relatively expensive relays, saves space, and generally reduces the need for expensive hard wire innerconnections. The "programmable" portion of the controller gives the computer operator or logic system designer flexibility. The programmable controller may be computer controlled or matrix controlled. An example of a matrix controlled programmable controller can be found in U.S. Pat. No. 3,950,736 issued Apr. 13, 1976 to Dix et al. Essentially, this requires the use of a diode matrix which may be programmed by moving diodes into and out of the matrix in a predetermined fashion. One disadvantage of this is a relatively cumbersome arrangement of the diode matrix and the level of dexterity and skill required in using or programming it.

With a computer controlled ladder diagram solver (sometimes called a line solver), a programming panel is used for initially programming or for subsequently changing the status of various memories contained in the programmable controller. Examples of this may be found in U.S. Pat. No. 4,021,783, issued May 3, 1977 to G. C. Highberger, and entitled "Programmable Controller". Another example may be found in U.S. Pat. No. 4,244,034, issued Jan. 6, 1981 and entitled "Programmable Dual Stack Relay Ladder Line Solver And Programming Panel Therefore".

With the processor controlled programmable controller, a relatively skilled operator utilizes keys or other entry means on a programming panel to enter a graphical representation of the reference ladder diagram into the various memories of the programmable controller. Various memory device types may be used but typically these are read/write memories known as RAM. After the reference ladder diagram has been entered, the states of the various inputs and output devices of the programmable controller are periodically sampled and updated. During a sampling process, information concerning the real world status of the contacts, relays, coils, etc. is written into the memories of the programmable controller. During a line solving operation, information from these memories is combined with information from the memory containing the user program information and jointly sent to the processing circuitry within the programmable controller. At the processing circuitry a solution is derived concerning the status of the various contacts and coils as a function of the reference ladder diagram and the real world status of the coils and contacts read from memory. This information is then utilized to update or change the contact and coil status in accordance with the solution. Often one or two or even more solutions must be conducted concurrently because of the parallel nature of the some of the apparatus in the rungs of the ladder diagram. Towards the end of a rung solution process, the variously stored information is brought together by the processor into one solution member which usually determines the status of the output coil controlled by the various relay contacts in the rung of the ladder diagram. This information is stored in a memory for utilization at a later sampling time to correspondingly control the actual status of the coil in question. Typically this updating of the real world devices occurs after all the rungs of the ladder diagram have been processed by the processing circuitry.

As can be seen the operation of the programmable controller is quite complex necessitating the use of the logic solving capabilities of the microprocessor. However one disadvantage with both of the above referenced patents is that the processor, i.e. microprocessor, is required for the solution of all the elements of the ladder diagram including both contact as well as noncontact type elements. Because the processor which is used to arrive at the solutions is a general purpose device, its use to solve logic will usually be slower than dedicated logic solving devices. Therefore it would be advantageous to have a programmable controller wherein at least a portion of the reference ladder diagram elements can be solved without requiring the use of the processor thereby decreasing the length of time required to arrive at the solution for the reference ladder diagram.

SUMMARY OF THE INVENTION

In accordance with the invention, a programmable controller for solving a ladder diagram having contact elements and noncontact elements with the contact elements being solved without the use of the processor is taught. The programmable controller includes a processor for controlling the functioning thereof and for utilizing the noncontact elements to provide a solution related to the diagram. Also included is a dedicated logic device termed a ladder diagram contact solver, also known as a dual stack line solver, for utilizing the contact element data and providing a solution thereto. Memory means for storing the elements of the ladder diagram in a representative form and for storing a status corresponding to each element of a ladder diagram in a representative form is interconnected with the ladder diagram contact solver and the processor via multiline address and data buses. The representative form of the element is a multibit data word wherein one of the data bits is used to determine the type of element involved. Depending on the width of the memory used the reference ladder diagram elements can be stored in memory as two sequential 8 bit data words or as a single 16 bit data word.

On the completion of power up initialization routines the stored elements of the ladder diagram along with the corresponding status elements are continuously read from memory and sent to the ladder diagram contact solver or the processor for solution. Contact type elements and corresponding status are presented to the ladder diagram/contact solver for solution with noncontact type elements being directed to the processor for solution. When a noncontact element is read from memory, operation of the ladder diagram contact solver is inhibited with the noncontact type element being transferred to the processor for solution. The actions of the processor are then defined by the information contained in the noncontact type element.

BRIEF DESCRIPTION OF THE DRAWINGS

For a better understanding of the invention, reference may be made to the embodiments exemplary of the invention shown in the accompanying drawings wherein:

FIG. 6 is a table of contact attributes;

DETAILED DESCRIPTION

The three basic sections of a relay control system are input, logic and output. In a typical relay control applications the input section consists of input devices such as pushbuttons, limit switches and photocells. The logic section is composed of control relays wired together to produce the desired real world operations. The output section contains output devices such as motor starters, motor contactors, solenoids and indicating lights. The primary difference between the relay control system and the programmable control system is that the control relay logic is replaced by a solid state processor and memory configuration. Through programming, the processor and memory configuration digitally processes all the data for system operation. The processor's memory is programmed via a programming panel to duplicate the required operating conditions of the control relay circuits. An advantage of this type of control is the ease with which the system's control logic can be modified into a variety of operating considerations via a programming panel. The input section contains the same input devices that are found in a relay control system. However the process input signals produced by these devices are converted into low level DC logic voltages suitable for solid state controller operations. The output section in the programmable control applications converts the low level logic signals from the processor to the voltage levels required to operate the output devices. The output devices themselves are the same as those utilized in the relay control systems.

Figure 1:
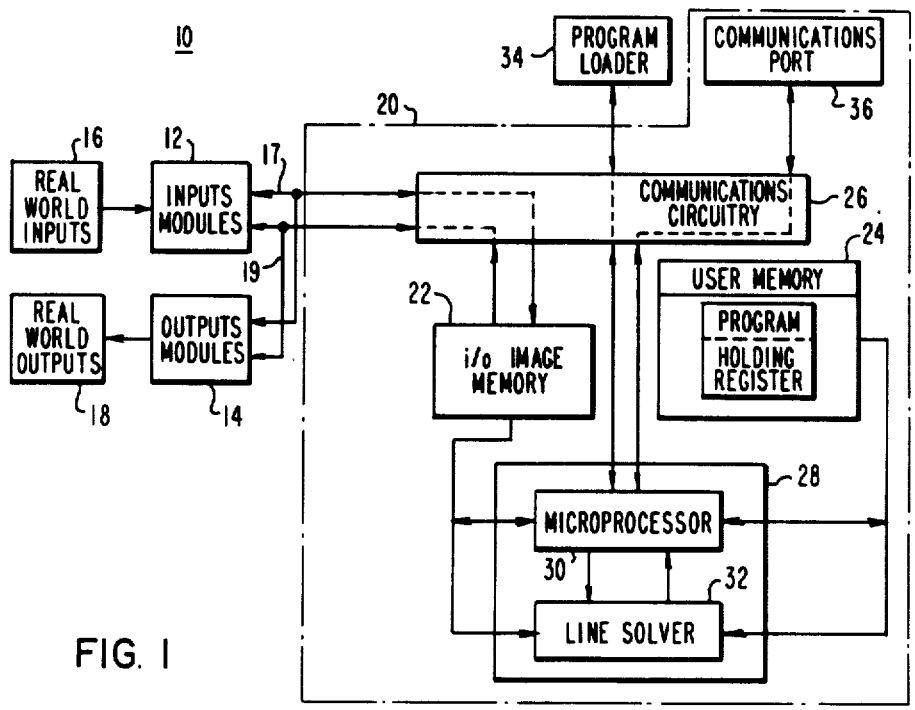
FIG. 1 is a block diagram of a programmable controller system exemplifying the present invention.

A block diagram of the basic programmable controller system 10 is shown in FIG. 1. Typically the input and output sections 12 and 14 respectively are comprised of one or more individual input and output modules respectively. Each input module is capable of being connected to one or more real world input devices 16. Typically either four or eight inputs are provided for each input module. A corresponding situation exists for each output modules 14 connected to real world outputs 18. The input and output modules are mounted in a rack which is innerconnected to the processor via an input/output address bus 17 and an input/output data bus 19. This i/o rack, as it is termed, is typically mounted adjacent to the processor. However, the i/o rack can be remotely mounted from the processor.

The types of inputs to the programmable controller include discrete, analog, or register. The discrete inputs are typically supplied by pushbuttons, relay contacts and other on/off type of devices. The analog inputs convert a voltage or current signal into a digital signal which is acceptable for use in the processor. The analog inputs provide an analog to digital converter to convert the analog signals into a digital representation of the corresponding magnitude of the analog signal. These analog input signals are typically supplied by process instrumentation and transducers. The register input modules are used to accept digital information typically provided in digital words consisting of 8 or 16 bits. The output modules provide control signals to discrete outputs, analog outputs or register outputs. The discrete outputs typically are used to turn an external device on or off. Examples of discrete outputs are motor starter coils, relay coils, solenoids, indication lights. The analog output module provides a digital to analog conversion of the processor output logic. The analog output signals produced are used to provide set points to process instrumentation, complete closed loop control, or provide speed reference to motor drive systems. Register outputs include digital 7-segment displays or a computer interface.

Field wiring from the actual or real world input and output devices is accomplished through terminals located on the modules. With the real world input and output devices wired to the terminals of the input and output modules, respectively, and the modules themselves plugged into the mounting rack the system logic contained in the processor is now ready to control the functioning of the system.

In FIG. 1 the blocks within the dashed line are normally associated with the main processing unit 20, also known as a CPU. Here the CPU 20 consists of i/o image memory 22, user program memory 24, communications circuitry 26 and the processing circuitry 28 including a microprocessor 30 and a dual stack line solver 32. The input modules 12 and output modules 14 are connected to the CPU 20 via the communication circuitry 26 and the buses 17 and 19. Also a program loader 34 for installing the user's reference ladder diagram into the user program memory 24 and for performing other functions including diagnostic functions can also be connected to the CPU 20. Additional communications ports 36 can also be provided. The arrowheads shown on the interconnecting lines between the various devices indicate the direction of data flow among the system components.

The user program memory 24 contains the user program, i.e. the reference ladder diagram elements, and serves as the storage location for holding register values required by program elements such as timers and counters. The i/o image memory 22 contains the status for all the input and output circuits at the beginning of each scan of the ladder diagram and stores newly determined coils and output register states developed during the reference ladder diagram line solving. The stored input circuit states indicate the states of input contacts and input registers. The stored coil and output register states control the states of the output circuits and output registers. Although the i/o image memory 22 and the user program memory 24 are shown as two individual blocks, these may be realized in a single memory device utilizing various memory mapping techniques. RAM devices can be used to provide the memory. Alternatively ROMs or EPROMS may also be used. The size of the memory is dependent upon the user requirements. Typical memory sizes are 512, 1536, 2560, and 3584 words of RAM memory, each memory word being either 8 or 16 bits in length.

The processing circuitry 28 containing the microprocessor 30 and ladder diagram solver 32 provides the vehicle for user program processing. Circuits are programmed into the processor from a reference ladder diagram using relay symbology. Each circuit is constructed element by element under programmed control via the program loader 34. The selected element states are used to determine whether the programmed circuit is conducting power.

Figure 2:
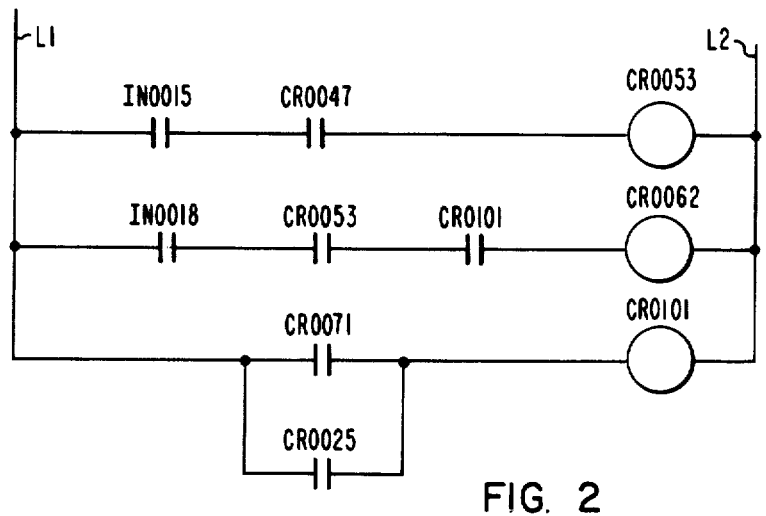
FIG. 2 is an example of a relay ladder diagram.

To determine which outputs must be activated the CPU 20 repeatedly scans the rungs of the reference ladder diagram programmed into memory. Using the processor 30, the CPU 20 examines all inputs to the system and stores their status in the portion of the i/o image memory. The processor 30 then scans the program rungs starting with the first rung programmed at the beginning of the reference ladder diagram to determine which circuits are conducting. The condition of each circuit, conducting or nonconducting, depends on the status of any associated inputs and on the status of the contacts that are controlled by other programmed coils. As the processor 30 sequentially scans the programmed circuits, the coil states are updated one by one. When a coil is updated during the scan, subsequent references to the updated coil's contacts reflect the updated status. In FIG. 2 for example, coil CR0062 is controlled by the status established for input IN0018 and coil CR53 during the current scan and the status established for coil CR0101 during the previous scan. As each circuit is scanned, the processor 30 stores the newly determined coil state in the i/o image memory 22. If the programmed circuit controls a special function, that is, a noncontact element such as a coil, timer or a counter, the special function sequence is activated when the programmed circuit changes to the proper state. The special function sequence changes the associated coil state register values in the processor memories. These states are used when the processor scans subsequent circuits. The newly determined memory states both for output coil and registers are used to update the status of any associated real world output at the end of the scan. Typically a scan occurs in less than 100 milliseconds. Thus the maximum amount of time that a change of state in an input can go undetected is the length of one processor scan.

In the i/o image memory 22 is the digital representation of the devices connected to the i/o cards. Because the operation of the i/o cards is slow in comparison to the scan times of the processor 30 in the CPU 20 and because the signals occur asynchronously to each other, it is necessary for proper operation of the programmable controller to make a snapshot of all the inputs at a given time. The processor takes this snapshot of all the inputs and solves the rungs of the reference ladder diagram based on the condition of these inputs as given in this snapshot and provides, given that set of inputs, what the particular outputs would be. Without this ability to freeze the state of the inputs at a particular time, various race conditions can occur resulting in incorrect solution to the ladder diagram.

Figure 3:
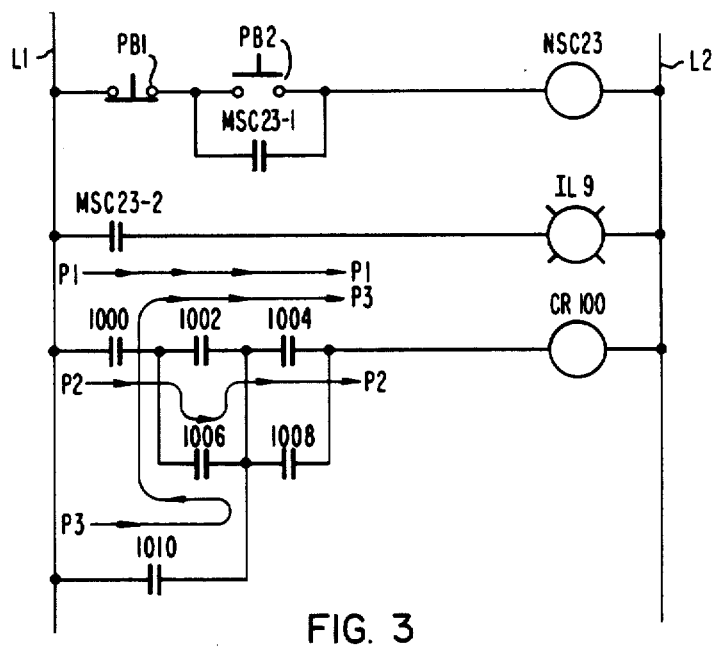
FIG. 3 is a second example of a relay ladder diagram illustrating power flow paths.

A conventional relay ladder diagram is shown in FIG. 3. This figure illustrates a simple stop/start circuit having an indicating light for a motor starter. In the circuit normally closed pushbutton PB1 is connected in series with the parallel combination of normally open pushbutton PB2 and normally open latch-in contact MSC231-1. This combination in turn is connected in series with the motor starter coil designated MSC23. The second line of the figure has a normally open auxiliary contact designated MSC232-2 connected in series with an indicating light IL9. These combinations of elements form two rungs of the ladder diagram positioned between the two power supply rails indicated as L1 and L2. Conventional power flow is from L1 to L2, i.e. left to right. The third rung of this ladder diagram illustrates three possible paths through the series parallel combination of contacts shown. Path 1 is through normally open contacts 1000, 1002, and 1004. Path P2 is through normally open contacts 1000, 1006 and 1004. Path P3 is through normally open contacts 1010, 1006, 1002 and 1004. Paths P1 and P2 illustrate the convention of the left to right power flow. Path P3 illustrates a right to left power flow through contact 1006. In relay ladder diagrams this is a permissible power flow path.

Figure 4:
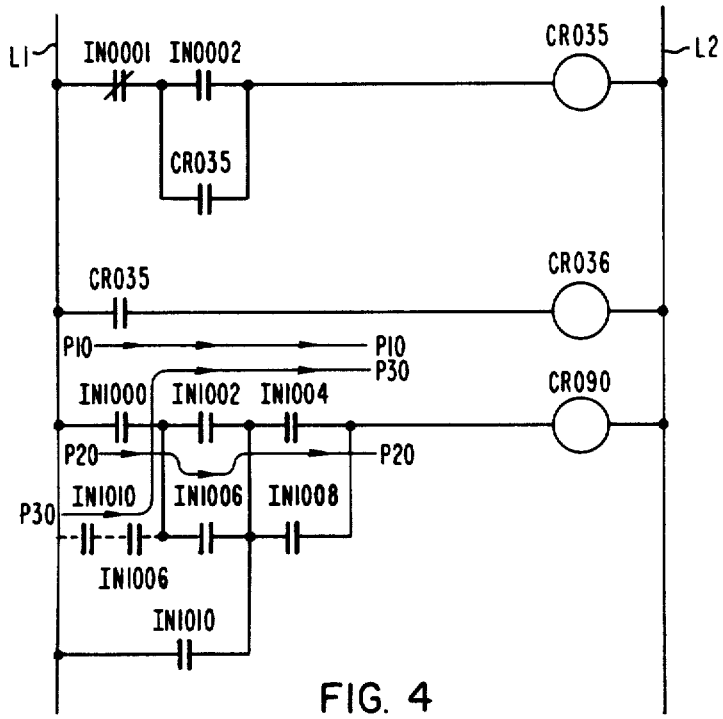
FIG. 4 is the programmable controller equivalent reference relay ladder diagram of FIG. 3.

In FIG. 4 the equivalent programmable controller reference ladder diagram is shown. The contacts labeled IN0001 and IN0002 represent inputs 1 and 2 respectively that are connected to pushbuttons PB1 and PB2 respectively. In a like manner the outputs designated CR035 and CR036 would be connected to motor starter coil MSC23 and indicator light IL9 respectively. It will be appreciated that the first two rungs of this ladder diagram are the logical equivalent to the first two rungs shown in FIG. 3. When pushbutton PB2 is closed input contact IN0002 will be energized or active. Because pushbutton PB1 is normally closed contact IN001 is active. The power flow is through contacts IN0001 and IN0002 allowing coil CR035 to energize. The normally open latch-in contact designated CR035 will close holding the coil CR035 energized until such time as pushbutton PB1 is opened causing contact IN0001 to deenergize or go inactive in turn deenergizing coil CR035. In rung 2 of FIG. 4 contact CR035 will energize the coil CR036 that is connected to output indication light IL-9. Thus indicator light IL-9 will be on when coil CR035 is on. As a matter of convention all contacts associated with an input or output carry the same reference designation. Thus the two contacts labelled CR035 in rungs 1 and 2 of FIG. 4. In contrast with an actual relay coil or other pysical device, the number of times a contact is referenced in the programmable controller is limited only by the maximum program size. For example, the actual PB1 has only one set of contacts that may be used; whereas, input IN0001, the logical equivalent to PB1, could, if desired, be referenced in the reference ladder diagram in excess of thirty times.

The third rung of the ladder diagram shown in FIG. 4 is the logical equivalent to that shown in FIG. 3. Again three alternate power flow paths P10, P20 and P30 are illustrated. Path P10 through contacts IN1000, IN1002, and IN1004 is the logical equivalent to path P1. Path P20 through contacts IN1000, IN1006 and IN1004 is the logical equivalent to path P2. However, because power flow in the programmable controller can only occur from left to right there is no logical equivalent for path P3. In order to have such a logical equivalent power flow through contact IN1006 would have to go from right to left. To achieve the logical equivalent to path P3 the two contacts 1010 and IN1006 shown in the phantom lines in FIG.4 would have to be added to the reference ladder diagram to achieve the same power flow path. In constructing the reference ladder diagram the element controlled by the logic that is entered is normally positioned as the last element adjacent the power rail L2. The controlled elements can be relay coils as shown, timers, counters or other special function elements. Timers and counters usually have a coil associated with them with the state of this coil being used to determine whether or not the timer or counter has reached the desired value. The number of contact elements that can appear in a line is usually limited only by the display capabilities of the program loader device used to enter the reference ladder diagram into the memory of the programmable controller.

Figures 5, 7:
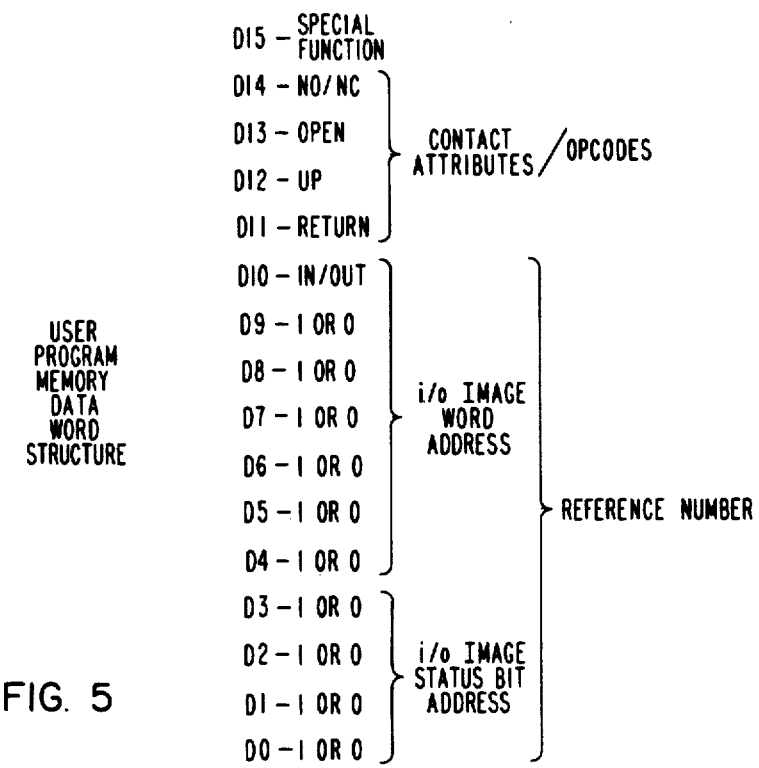
FIG. 5 illustrates the structure of the user program memory word.
FIG. 7 illustrates the relationship between the elements found in a reference relay ladder diagram and their representative digital form.

The elements of the reference ladder diagram are stored in the user program memory 24 of the programmable controller in a representative form. The preferred structure for the user program memory data word is shown in FIG. 5. As shown there the 16 data bits D0–D15 comprise the representative form for the element. The segments D0–D10 form what is termed as the reference number of the element. Bits D11–D14 provide information concerning the contact attributes or special function element operational codes. Bit D15 is a toggle bit and provides information concerning whether or not the particular element is a special function element (i.e. noncontact type element) or a contact element. If bit D15 or the special function bit is set then the data on lines D11–D14 is a special function opcode. If D15 is not set then the data on lines D11–D14 represent contact attribute data. The reference number portion of the data word is used as the address for that element's corresponding status that is stored in the i/o image memory. The use of this reference number portion of the data word will be explained hereinafter. Although the preferred data structure is shown in FIG. 5, the meaning for each of the data bits can be reassigned. Corresponding changes to the circuit arrangement would also be required if meaning of a particular bit were changed. Good design technique would, however, place related items sequentially as shown in FIG. 5.

As with the arrangement of the data bits, the value of reference number portion of the data word is arbitrary. In all programmable controllers the number of inputs and the number of outputs is limited due to a number of variables including memory capacity and maximum scan time. In order to internally distinguish between inputs and outputs, a range of numbers is usually set aside for input elements with a second range of numbers for output devices including timers and counters. In one numbering scheme the numbers 0 to 1023 are reserved for inputs with the numbers 1024 to 2055 being reserved for outputs. Thus, for input 0018 the internal reference number would be 0018. For output 0018 the internal reference number would be 18+1024 or 1042. It will be appreciated that the use of this offset value of 1024 is accomplished by setting bit D10 of the data word shown in FIG. 5 to a one. Other offset values can be used. These offsets usually are powers of 2. The addition of this offset is transparent to the user and is usually performed by the programming panel. Thus, the user sees input 0018 and output 0018 while the processor sees input 0018 and output 1042. The particular number scheme and number range is established by the designer of the programmable controller. Typically, the offset is chosen to be the largest number of inputs that are expected to be used with a particular design of programmable controller.

The contacts which are programmed in the reference ladder diagram have attributes that are associated with them. These are the attributes termed OPEN, UP, RETURN and NC/NO (normally closed/normally open). FIG. 6 presents a chart showing the 16 various combinations of these four attributes and the corresponding reference ladder diagram symbol. In the chart the X indicates that the attribute is present and the dash (−) indicates that it is absent. Looking at only the three attributes OPEN, UP and RETURN, there are eight innerconnection combinations for each contact type (8 for NC, 8 for NO). These are as follows: OPEN ONLY, UP ONLY, RETURN ONLY, OPEN AND UP, OPEN AND RETURN, UP AND RETURN, OPEN UP AND RETURN, and NO OPEN, NO UP, AND NO RETURN. With these eight innerconnection combinations coupled with NC/NO contact type, any reference ladder diagram can be entered into the programmable controller. These attributes are used by the processor and in particular the dual stack line solver, to evaluate the power flow status of the contact type element in the rung of the reference ladder diagram.

FIG. 7 illustrates the relationship between the reference ladder diagram symbol and the memory data word in the user program memory. For the RETURN ONLY N.O. contact of row 1 the data on lines D10–D15 is 0,1,0,0,0,0, respectively. For RETURN ONLY N.C. contact (of row 2) the data on these lines is 0,1,0,0,1,0. For the RETURN and UP N.C. contact (of row 3) these lines contain the data 0,1,1,0,1,0. In row 4 an output coil is shown. Here the data on lines D10–15 is 1,Y,Y,Y,Y,1 where Y,Y,Y,Y represents an operation code or opcode for use by the processor with each Y being either set (1) or not set (0). The data of lines D0–D9 is shown by X's as these values are determined by the element reference number. Because D15, the special function bit is not set in rows 1–3 of FIG. 7, the data represents a contact type element. Further because D10 is not set these elements are input contacts. In row 4 the special function bit D15 is set indicating a noncontact type element or special function. The opcode on lines D11–D14 will determine the type of noncontact element i.e. output coil, timer counter, register etc. and the number of memory words required to define the noncontact element. For the present invention an output coil requires 1 word of memory while a timer or a counter each requires 3 words of memory. Thus, when a timer element is read, the processor is instructed by the opcode to read the next two memory words. Where multiword elements are present the required memory words are stored in memory in a sequential fashion. The setting of the lines D10–D15 and the allocation of memory words is done automatically by the programming device and is transparent to the user.

Once the reference ladder diagram and the status of the input devices exist in the user program memory 24 and the i/o image memory 22, respectively, the CPU 20 can initiate the solving of the reference ladder diagram. The processor 30 is used to evaluate the special function elements while the dual stack line solver 32 also termed a ladder diagram contact solver is used to evaluate the contact elements. The operation of the dual stack line solver 32 and the programming loader 34 is fully set forth in U.S. Pat. No. 4,247,909 issued Jan. 27, 1981 and entitled "Programmable Dual Stack Relay Ladder Diagram Line Solver With Shift Register" and U.S. Pat. No. 4,244,034 issued Jan. 6, 1981, entitled "Programmable Dual Stack Relay Line Solver and Programming Panel Therefore". Because of the complete description of the dual stack line solver found in these patents, only a functional description of the dual stack line solver 32 will be provided herein. Although the dual stack line solver can be implemented using discrete logic circuits, preferably it is a gate array device consisting of five inputs, nine outputs, clock and clear. The gate array is organized as two eight bit bidirectional shift registers plus a mode select and shift register input circuitry. By providing the contact attributes as well as the corresponding status of the contact element as inputs to the dual stack line solver 32, the power flow condition i.e., conducting or nonconducting, of the contact element can be determined. The mechanics of this operation can be found in the previously referenced patents. With these two previously cited patents, the dual stack line solver for solving the contant elements is under the direct control of the processor 30. Because of the involvement of the processor 30 in the solving of the contact elements, the time required to determine their solution would be greater than if only logic elements were involved. Thus if the line solver could be made to operate without relying on the decisional making capabilities of the processor 30 the speed of the solution for the reference ladder diagram could be increased.

With the present invention the processor 30 is not involved with the contact element solving. Although it is still utilized in the solving of the special function elements contained in the reference ladder diagram. However, because contact elements far outnumber other elements usually found in such diagrams, the elimination of the use of the processor 30 in solving the contact elements greatly increases the speed of solution of the reference ladder diagram. The magnitude of this increase is dependent upon the particular user program that is entered.

The user program memory 24 is a RAM chip in which the 16 bit memory data word is stored. The memory data word can be stored either as a single 16 bit word or as two 8 bit words. Where the data word is stored as two 8 bit words, the data is read from the memory with the higher order 8 bits being read first followed by the lower order 8 bits of the data word.

With the data stored as a single 16 bit word the entire word is read at one time. Because the element type is determined by the special funcion bit of the data word, with the 16 bit version the element type must be determined prior to the operation of the dual stack line solver 32. This is accomplished by delaying the operation of the dual stack line solver 32 until the status of the special function bit is determined. If the special function bit is set indicating a special function, the processor 30 receives an interrupt to inhibit further reading of the user program until the noncontact element or function is performed. When the 8 bit version for the data words is used, the delaying of the operation of the dual stack line solver is not necessary. Because the higher ordered bits of the memory data word that include the special function bit are read first from the user program memory, the status of this bit can be determined with the appropriate action taken prior to the reading of the remaining lower order bits of the data word. In general, the memory data word stored in the user program memory are located at a 16 bit address. An address port is provided on the memory for receiving this address data from external devices such as the processor. The user program memory can be accessed in two modes, user mode and logic mode. When in the user mode data may be written into or read out of the user program memory without initiating any line solving operations. This allows for programming the programmable controller with the reference ladder diagram or viewing the contents of the memory while the programmable controller is active in the logic mode without affecting the program solution. When in the logic mode, the data and the user program memory is being used for logic solving functions.

The structure of the i/o image memory 22 corresponds to that of the user program memory. The i/o image memory can be implemented with either the 8 or 16 bit data word structure and is accessible in either the user mode or logic mode. In the user mode the value of the data in the i/o image memory can be set by the user and can be used to override the actual data present. Because this data corresponds to the status of the inputs and outputs this overwrite capability allows an input or output to appear as being permanently on or off. This technique is also known as forcing i.e. the input or output is forced into a given state.

Figure 8:
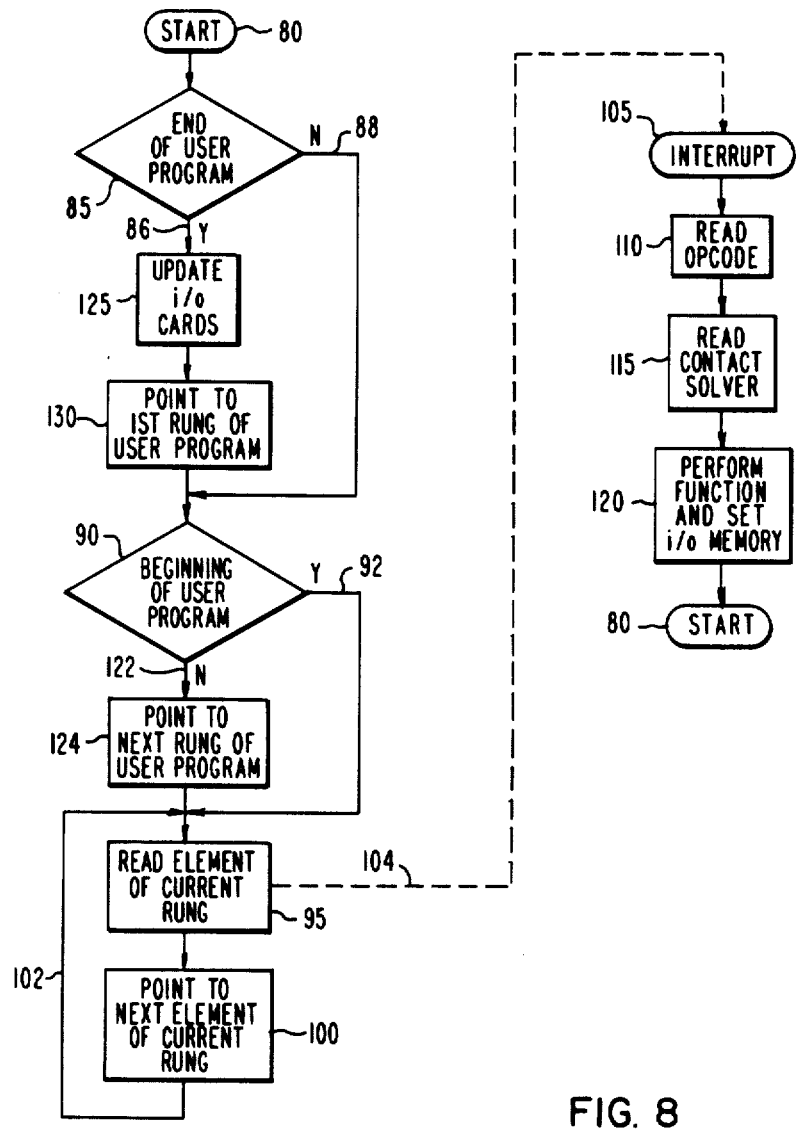
FIG. 8 is a structured flow diagram of the present invention.

A simplified flow diagram for the programmable controller of the present invention is shown in FIG. 8. The reference ladder diagram and the status of the inputs and output have previously been entered into the user program memory and the i/o image memory, respectively. Upon startup of the programmable controller, routine diagnostic functions are performed by an executive program found in an executive program memory (not shown). After the successful completion of these initialization routines, the executive program directs the processor to begin the solving of the reference ladder diagram at start block 80. The decision block 85 directs the processor to look for end of user program character. If no program were present or this was the end of the user program, then decision path 86 would be followed. However, because we are assuming there is a program and initialization has been completed, decision path 88 is followed. This leads to decision block 90 where the processor is directed to look for the beginning of the user program. (The executive program is used to provide the memory location of the first element of the first rung of the user program. The user program memory location are automatically assigned to the elements when they are programmed into the programmable controller. Again these housekeeping chores are transparent to the user.) Because we are at the beginning of the user program, from block 90 decision path 92 is followed leading to directive block 95 where the processor is directed to read an element of the current rung of the reference ladder diagram. If the element read is a contact-type element, it is automatically sent to and solved by the contact solver. This does not appear as a block in FIG. 8 as it is independent of the processor operation. Next, the processor is pointed to the next element of the rung at directive block 100. At 102, the program then loops back to directive block 95 to repeat the element read cycle.

When at directive block 95 if the special function bit is set, the program sequence jumps via path 104 to generate an interrupt 105 to the processor. Discrete logic is used to determine the status of the special function bit. This logic generates the interrupt to the processor. Because the interrupt has occurred, the processor reads the data from the user program memory as a particular opcode at directive block 110. Next at directive block 115, the processor reads the data contained in the contact solver. Based on the opcode and the contact solver data, the processor at directive block 120 preforms the opcode function and sets the i/o image memory accordingly. The processor then proceeds back to the start block 80. Each rung of the ladder diagram is structured to end in a special function or noncontact-type element. Accordingly, when such an element is encountered, the end of a rung is normally assumed by the processor.

Assuming there is more than a single rung, at decision block 90 decision path 122 is followed to directive block 125 as we are no longer at the beginning of the user program. The processor is pointed to the next rung of the user program at directive block 124. This new rung is then read element by element at blocks 95 and 100. This process continues until the end of the user program is encountered. At the end of the user program the i/o cards are updated and the processor is directed back to the first rung of the user program via directive blocks 125 and 130, respectively. At this point one scan has been completed. Scanning continues until the programmable controller is deenergized or a malfunction is detected.

The processor is being used as a means to sequentially read the data from the user program memory. In a typical user program, a series of contact-type elements usually proceed a special function element. Thus, the user program data is being continuously read from the user memory directly to the contact solver for solution. No other action is required of it until the interrupt is generated. Although discrete logic can be used to provide this reading of data from the user program memory, the use of the processor is preferable. Because the processor is required to perform other tasks in the programmable controller and is therefore available, its use in this manner eliminates the expense of providing discrete memory read circuitry.

In FIGS. 9-12, two embodiments of the invention are presented. In both embodiments, all ENABLEs and READs are low true and are provided with pull-up resistors. This means that these signal lines are high or a 1 when inactive and are low or 0 when inactive. This is done for protection purposes so that if a noncritical device or card such as an input module is removed for servicing or other purposes, the ENABLE or READ signal will become false thus preventing access to that particular device. Data and address line are high true. ENABLE lines are designated EA, EB, etc. The reverse logic may be used provided the logic circuits to which these signals are sent are also appropriately changed to reflect the inversion in the logic.

Figure 9:
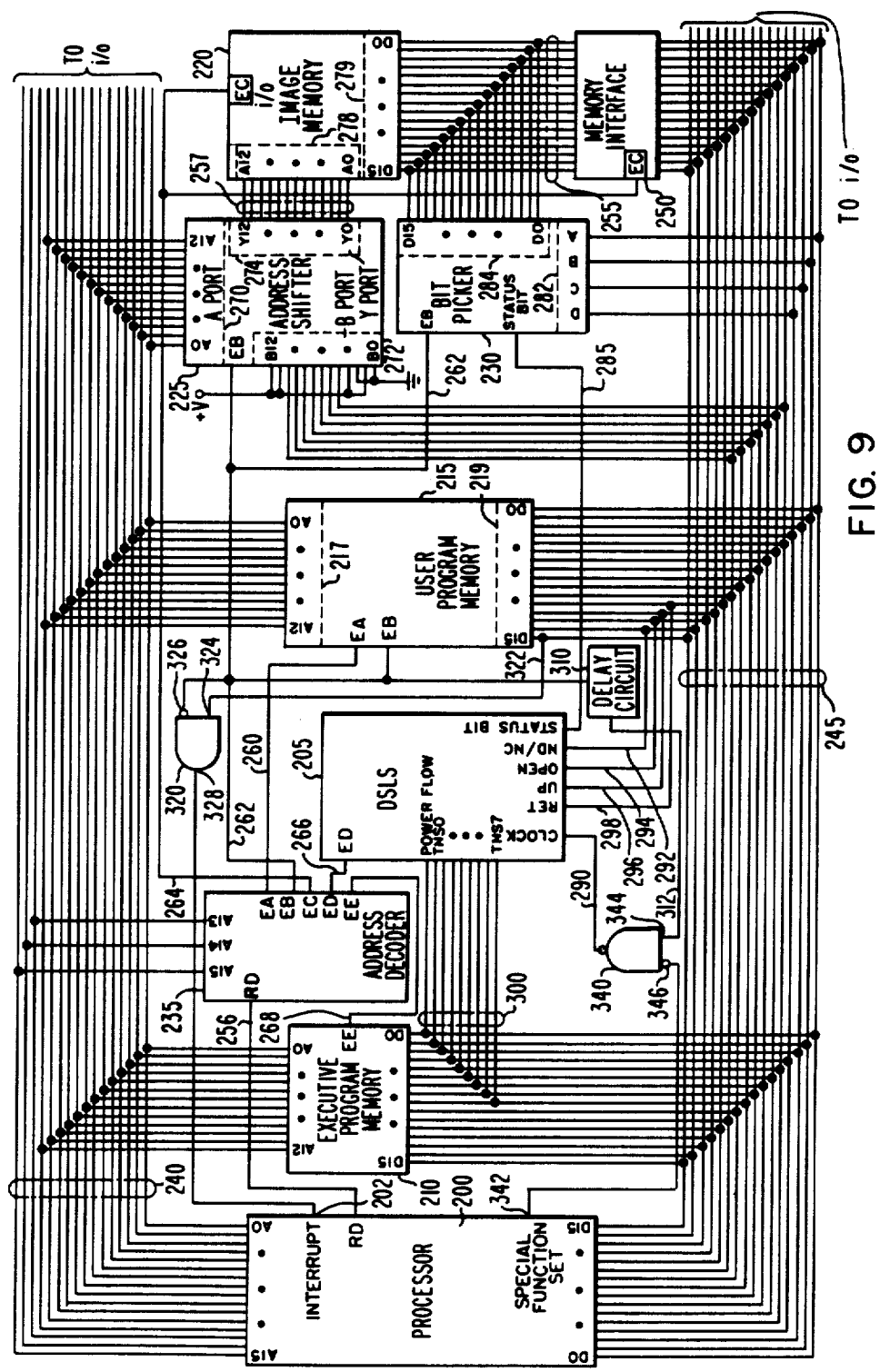
FIG. 9 is a 16-bit embodiment of the present invention.

A 16 bit implementation of the present invention is shown in FIG. 9. The units of the programmable controller are a processor 200, a dual stack line solver 205, an executive program memory 210, a user program memory 215, a i/o image memory 220, an address shifter 225, a bit picker 230 and an address decoder 235. A 16 line address 240 bus and a 16 line data bus 245 interconnect the processor 200, user program memory 215, dual stack line solver 205, the address shifter 235 and the bit picker 230. The i/o image memory 220 is connected to the data bus 245 via a bi-directional interface 250 and data bus 255. The address portion of the i/o image memory 220 is connected to the address shifter 225 via a 13 line address bus 257.

The processor can be a 16 bit microprocessor such as the iAPX 86/10 16 bit HMOS microprocessor specified in the 1981 Intel Corporation Component Data Catalog (Intel 8086). The address decoder 235 is essentially a 3 to 8 or 1 of 8 of 16 a demultiplexing device. The input to the address decoder is from higher order address bits from an address provided by the processor 200 or the executive program memory 210. Address lines A13, A14 and A15 are used. The particular address lines that are used are a function of the memory size and memory address coding. Other address lines can be used than those shown and the selection is a matter of design choice. The outputs of the address decoder 235 are five ENABLE signals EA 260, EA 262, EC 264, and ED 266; and EE 268 which are interconnected to the various other components of the system. The RD (read) line 256 is used by the processor 200 to control the operation of the address decoder 235. The ENABLE outputs of the address decoder follow the state of the RD line 256. EA 260 is used to provide access to the user program memory 215 in the user mode, i.e., to allow the data to be read or written into the user program memory 215 without affecting the logic solving operations. Similarly, ED 264 allows access into the i/o image memory in the user mode without affecting the logic solving operations. ED 266 allows reading of the data contained in the dual stack line solver 205 without initiating logic solving operations. EE 268 allows access to the executive program memory 210 in the user mode. EB 262 is active when logic solving operations are required. EB 262 is provided to the user program memory 215, the address shifter 225, the bit picker 230 and to the dual stack line solver 205 via a logic circuit described hereinafter.

The user program memory 215 has a 16 line address port 217 and a 16 line data port 219 as well as inputs for EA 260 and EB 262. However, as shown in FIG. 9, only those lines not decoded by the address decoder (A0–A12) are actually used for the address port 217. The user program stores the elements of the reference ladder diagram in the 16 bit representative form shown in FIG. 5. Each element has a corresponding address in the user program memory 235 and is accessed by providing the proper address to the address port 217. When EA 260 is active, data may be read from or written to the user program memory 215 without causing or effecting line solving operations. When ENABLE B 262 is active, the data is read from the user program memory 215 via the data port 219 onto the data bus 245. For a contact type element the data representing the contact attributes (lines D11–D14) is sent to the dual stack line solver 205. The data representing the address of the corresponding status bit is sent to the address shifter 225 and the bit picker 230 and is used to select the status bit from the i/o image memory 220 as detailed hereinafter.

The address shifter 225 has two 16 line input ports port A 270 and port B 272—and one 16 line output port port Y 274. With both input ports only those not decoded by the address decoder 235 need to be connected. For port A 270 these are lines A0–A12; for port B lines B0–B12. Similarly, for the Y port only lines Y0–Y12 are necessary. The A port 270 is connected to the address bus 240 with the B port 272 connected to a portion of the data bus 245. When EB 262 is not active, the address appearing on the A port 270 will be transferred to the Y port 274 which in turn is connected via the address bus 257 to the address port 278 of the i/o image memory 220. Because EB 262 is not active, this indicates that the programmable controller is not in a logic solving mode. Concurrent with this transfer of the address on the A port 270 to the i/o image memory 220, the EC 264 input to the i/o image memory 220 and EC input to the memory interface 250 would also be active. This indicates that the processor 200 is either transferring information to or receiving the information from the i/o image memory 220 in the user mode. In this case no logic solving operations are in progress.

With the configuration shown in FIG. 9 only data bus lines D4–D10 need to be inputted to the B port 272 of the address shifter 225. The unused lines of the B port are tied either to the voltage supply or to ground to generate an address offset. The addresses that are generated at the B port 272 of the address shifter are comprised of the offset value plus a value determined by the data present on the data bus lines D4–D10. The data appearing on lines D4–D10 is a portion of the reference number of the element that has been read from the user program memory 215. This data together with the offset is the address of the location in the i/o image of the memory 220 status bit corresponding to the read reference element. Port B 272 is used only when the enable EB 262 is active. This indicates that the programmable controller is in the logic solving mode of operation. Although the B port 272 input lines used to generate the offset value are shown as being tied either to ground or to the system power supply, single-pole double-throw switches can be used to permit the connection of these lines to either of these voltage levels. The would permit other offset values to be easily obtained if desired.

The bit picker 230 is a 4 to 16 or a 1 of 16 demultiplexer or decoder having a 4 line (A,B,C,D) input select 282. The select inputs to the bit picker 230 are the lower four reference number bits (D1–D3) of the ladder diagram element read from the user program memory 215. EB 262 is another input. The bit picker 230 also has a 16 line input port 284 that is connected via the 16 line data bus 255 to the data port 279 of the i/o image memory 220. When EB is active, the bit picker 230 selects one of the 16 data bits present on its data input port 284 according to the value present on the input select 282. The bit that is selected is known as the status bit 285 and is sent as an input to the dual stack line solver 20S. The status bit 285 represents the state or status of the corresponding ladder diagram element that has been read from the user program memory 215. The data which is present on the input port 284 of the bit picker 230 is determined by the address that is generated on the B port 272 of the address shifter 225.

The dual stack line solver 205 is used for determining the status or power state of the contact type elements. The inputs to the dual stack line solver are a clock input line 290, ED 266, the contact attributes consisting of NO/NC 292 the OPEN 294, UP 296 and RETURN 298 and the bit status 285. The outputs are termed the POWER FLOW 300 and the Two Node Stack Outputs TNS0–TNS7. The ED 266 input is used to read the state of the outputs without initiating the operation of the dual stack line solver 205. When clocked via the CLOCK input 290 the dual stack line solver 205 will act to solve the contact element attribute and status data that is present at the respective inputs. The contact attribute inputs 298, 296, 294 and 292 to the dual stack line solver 205 are connected to the data bus 245 at lines D11–D14, respectively. The power flow output 300 and the TNS0–TNS7 outputs are connected to lines D0–D8, respectively, of the data bus 245. The lines TNS0–TNS7 represent data which may be required for the solution of the special function or noncontact elements of the reference ladder diagram such as a proportional integral derivation control function. This information results from the solution by the dual stack line solver 205 of the contact type elements that are also present in the same rung of the ladder diagram in which the special function element also appears.

The circuits consisting of the delay circuit 310, AND gates 320 and 340 and the processor 200 are used to control the clocking of the dual stack line solver 205. The clock input signal 290 is essentially the logical AND of the status of special function bit and a delayed EB signal. The dual stack line solver 205 is clocked on the trailing edge of the EB signal 262 at the end of each read cycle. This trailing edge occurs when the EB signal 262 transitions from active low to high. The arrival of this low to high transition at the dual stack line solver 205 is delayed by the delay circuit 310 that has EB 262 as its input and the delayed EB 312 as its output. Any conventional delay circuit can be used. Using AND gate 320 and this delay allows determination of the status of the special function bit 322 (line D15 of user program memory data port 219) that has been read from user program memory 205 subsequent to the decoding of EB 262 by the address decoder from the address on the address bus eventually used to access the user program memory 215, but prior to dual stack line solver operation.

At AND gate 320 the special function bit 322 is connected to the noninverting input 324 with EB 262 connected to the inverting input 326. The output 328 of AND gate 320 is routed to an interrupt input 202 of the processor 200. When EB 262 is active low, the output 328 will follow the status of the special function bit 322. When the special function bit 322 is set, the output 328 of AND gate 320 is active high generating the interrupt input 202 allowing the processor 200 to assume control of the logic solving process and inhibit operation of the dual stack line solver 205. This interrupt occurs before the delayed transition of EB from active low to high can clock the dual stack line solver 205. One means to inhibit dual stack line solver 205 is via AND gate 340. The delayed EB signal 312 and a special function set output 342 from the processor 200 are connected to the noninverting and inverting inputs 344 and 346, respectively, of AND gate 340. The output of AND gate 340 is connected to the clock input 290 of the dual stack line solver 205. When special function set 342 is low, the output of AND gate 340 follows delayed EB 312. When special function 342 is high, the output of AND gate 340 will remain low regardless of the state of the delayed EB 312. Other circuits for inhibiting the dual stack line solver can also be used. The AND gate 340 is merely illustrative of the desired action when a special function bit is detected.

The operation of the 16 bit processor system is based on the implementation of a block move instruction by the processor. With this instruction the processor causes the sequential reading of data from the memory for a given number of elements. The number of elements that are moved with this instruction must be greater than the number of words which can be found in an individual rung of the ladder diagram. With the present system because of the limitation of the display devices of the programming panel, the length of each rung of the reference ladder diagram does not exceed 70 words. Accordingly the length of the block move instruction must be at least 71 words. This assures that the entire contents of the rung are read from the user program memory. For displays having greater display capability this number is easily increased to account for the larger number of elements allowable in the rung. Where the rung of the ladder diagram is less than 70, the block move instruction being executed by the processor will be interrupted by the appearance of the special function element on the data lines of the user program memory.

In a block move instruction the starting address for the move is generated by the processor 200 or from the executive program memory 210 with the address automatically incrementing or decrementing until the total number of words specified in the instruction to be transferred is moved or the special function interrupt is received by the processor 200. In a normal block move instruction, the data that is put onto a data bus is read and used by the microprocessor with a result being written from the processor to a specified destination on the next cycle of the system clock (not shown). Thus, the block move may be described as read data from a source into the processor then write data from the processor to a destination. However here, when the contact-type element read from user program memory and placed on the data bus 245, it is at essentially the same time received by the dual stack line solver 205 and is used there when the line solver is clocked at the end of the read cycle portion of the block move instruction. Because the processor does not use the contact-type data, any destination address that may be used during the write cycle will merely be a dummy address. Thus, the processor may be thought of as idling during the write cycle portions of the block move instruction when contact-type elements are present on the data bus. This increases the overall speed of solution of the reference ladder diagram.

In the logic solving mode, when the block move instruction is executed, the address decoder 235 activates EB 262. EB 262 follows the state of the RD line 256. In a block move instruction for each element that is read from the user program memory 215, the RD line 256 cycles to the active state during the read portions of the block move instruction. In turn user program memory 215, the address shifter 225, the i/o image memory 220, the bit picker 230 will be enabled for logic solving operations. When any element of the user program is read during the block move from the user program memory 215, the data is placed onto the data bus 245. For a contact-type element, the contact attributes represented by data lines D11–D14 of data port 219 of the user program memory 215 are presented to the dual stack line solver 205. The four lower order bits D0–D3 of this data port are presented to the input select 282 of the bit picker 230 with lines D4–D10 being presented to the B port 272 of the address shifter 225. The data on lines D4–D10 plus the offset value form the address of the corresponding location in the i/o image memory 220 at which the status of the contact element that has just been read from the user program memory 215 will be found. This location of status information consists of 16 bits of information which are outputted from the i/o image memory 220 via data port 279 and presented to the bit picker 230 at its data port 284. Based on the value of the data existing on the four lower order bits D0–D3 present on the input select 282 of the bit picker 230, one bit of the 16 possible bits read from the i/o image memory 220 will be selected and sent to the dual stack line solver as the status bit 285. Because operation of the dual stack line solver 205 is inhibited until the state of the special function bit is determined, the contact attribute data and the status bit are present prior to the arrival of the CLOCK signal 290 that initiates the operation of the dual stack line solver 205.

This sequence of events continues until the maximum number of words has been read or until an element is read from the user program memory 215 wherein the special function bit is set. At this point the processor 200 is interrupted causing the EB 262 to become inactive and inhibiting the dual stack line solver operation. This allows the processor 200 to solve the special function element in a rung of the reference ladder diagram using the data read from the user program memory 215 as well as the data read from the dual stack line solver 205 using the ED 266 line that represents the solution of the previously solved contact type elements for that rung. On solving of the special function element, the processor 200 via the address bus 240 and the address decoder 235 cause EC 264 to become active. This allows the solution data generated by the processor 200 to be read into the i/o image memory 220 via data bus 245 and memory interface 250. This data represents the updated status of the inputs and outputs based on the solution of the scan of the particular rung of the ladder diagram. Because no decisional making involvement of the processor is required for the solution of the contact type elements, the overall time required to reach the solution of a rung of the ladder diagram is decreased. Put in another way the speed of operation is increased.

Figure 10:
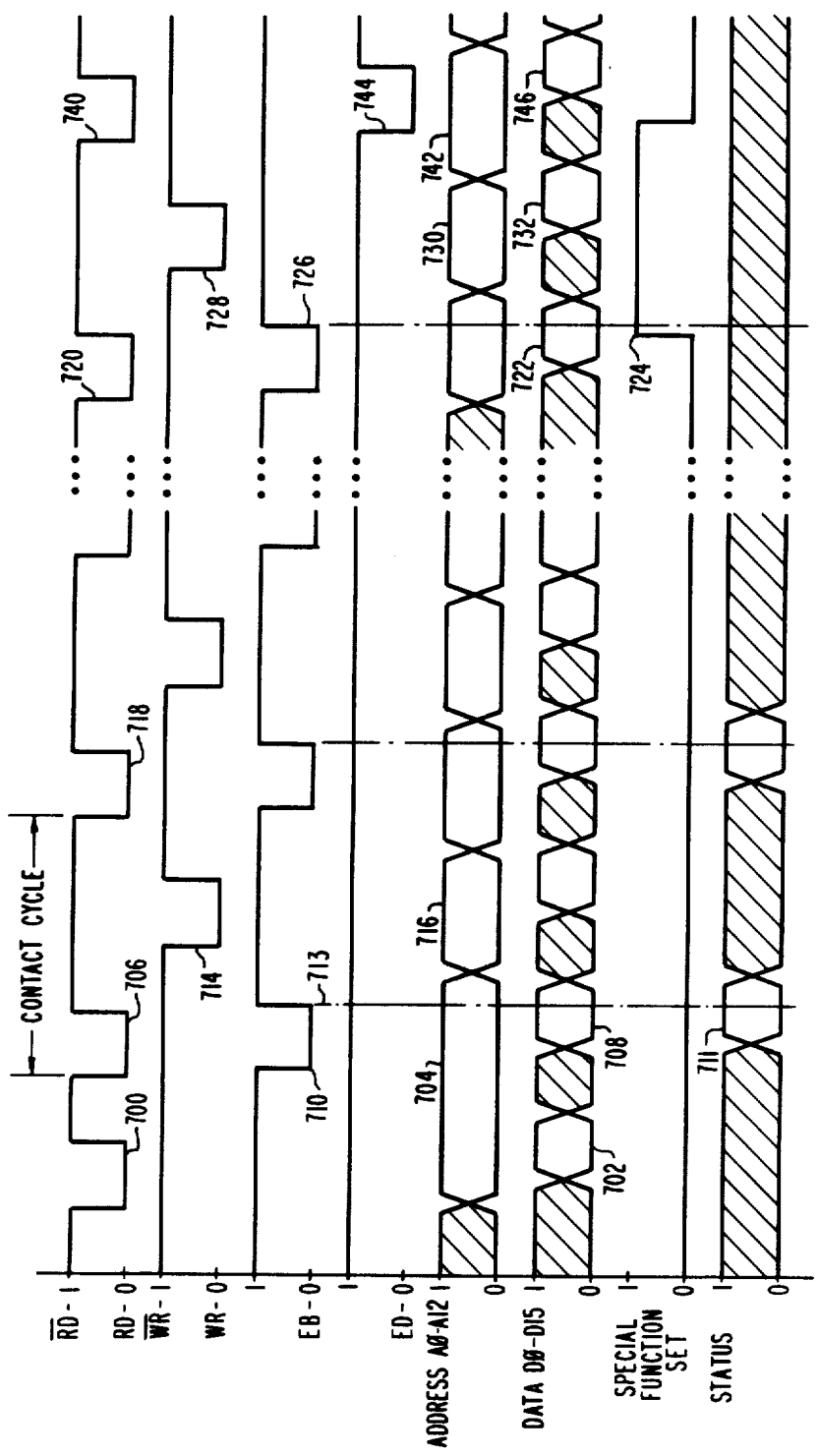
FIG. 10 is a timing diagram for the embodiment shown in FIG. 9 during a block move instruction.

In FIG. 10 a timing diagram for the 16 bit implementation of the present invention for the block move is illustrated. With the exception of the addresses, the data, and the interrupt, the other timing lines are active low (0). Cycle 1 at 700 is the cycle during which the processor 200 reads the block move instruction from the executive program memory 210 (EE 268 is active at this time but is not shown in this Figure). This instruction contains the operations code or opcode that appears on the data bus at 702 that identifies it as a block move instruction. The opcode present during cycle 1 also includes a source address, a destination address and the number of data words to move. In our case the source address at 704 is an address of the first element in the user program. The source address is placed on the address bus at 704 where it is used by the address decoder and user program memory to select the EB 262 line and first element of the user program. On the second cycle, the processor toggles the RD line to active low at 706 and reads the data at 708 taken from the location in user program memory specified by the source address at 704. Shortly after the RD line toggles active, the address decoder 235 decodes the code for the EB signal and EB 256 is toggled to the active state at 710. The data at 708 outputted by the user program memory is an element in the reference ladder diagram. Where the user program element is a contact element, the contact attribute data are at the appropriate line solver inputs when the element is placed on the data bus. With the user program contact element on the data bus, the corresponding status bit that is sent to the liner solver 205 is selected from the i/o image memory 220 via the bit picker 230. Selection of the status bit is based on the address formed by the address offset and reference number portion of the element that are at the B port 272 of the enabled address shifter 225. The status bit is shown at 712. The status bit at 712 and the contact attributes at 708 are now both present at the line solver that is then clocked slightly after the transition of the EB signal from low active to high as shown at 713. On the arrival of the delayed EB signal at AND gate 340 the line solver is clocked with the status bit and contact attributes being used to determine the power flow state of the contact element. The access mode used here to enter the i/o image memory is also termed bit mode accessing as a single bit is ultimately accessed and used. When the i/o image memory is accessed as during an update of the i/o cards, a byte mode access is used, i.e., an entire 16 bit byte is read from the i/o image memory. On the arrival of the delayed EB signal at AND gate 340, the line solver is clocked and uses the status bit and the contact attributes to determine the state of the contact element.

At cycle 3 at 714 a write cycle by the processor occurs. This is a wasted cycle because the line solver 205 does not need anything to be written to it as it has already performed the contact solving operation. Thus, the destination address at 716 that now appears on the address bus is a dummy address having no effect on the operations of the system. Were the processor capable of executing a block move instruction without the need of a destination address, this dummy address could be eliminated without affecting the operation of the system. On cycle 4 at 718 the next user memory data word is accessed. The preceding sequence of steps occurring during cycles 2 and 3 continues for each successive contact element memory data word until a data word is read from the user program memory that has its special function bit set. When this bit is set it prevents the line solver from being clocked and provides an output that interrupts the processor from the block move instruction.

During the read cycle at 720 the memory data word at 722 has the special function bit set. AND gate 320 generates the interrupt to the processor which causes the SPECIAL FUNCTION SET line to go high at 724 disabling AND gate 340 and preventing the delayed EB signal from clocking the line solver when EB cycle transitions at 726. The data at 722 also contains the opcode that will be executed by the processor. During the write cycle at 728 the data on the address bus at 730 and on the data bus at 732 represent information relating to the opcode that had been read. Where the special function indicates a coil, the processor will read the outputs of the line solver that contain the power flow status of the coil and then write the coil status to the i/o image memory. At read cycle 740, the data on the address bus at 742 contains the code for causing ED 266 to go active as shown at 744 allowing the processor to read the line solver. The data bus at 746 contains the power flow status of the coil element obtained from the line solver. In the subsequent cycles (not shown), this coil status is then written to the i/o image memory. The block move by the processor for the next rung is then started.

Figure 11A:
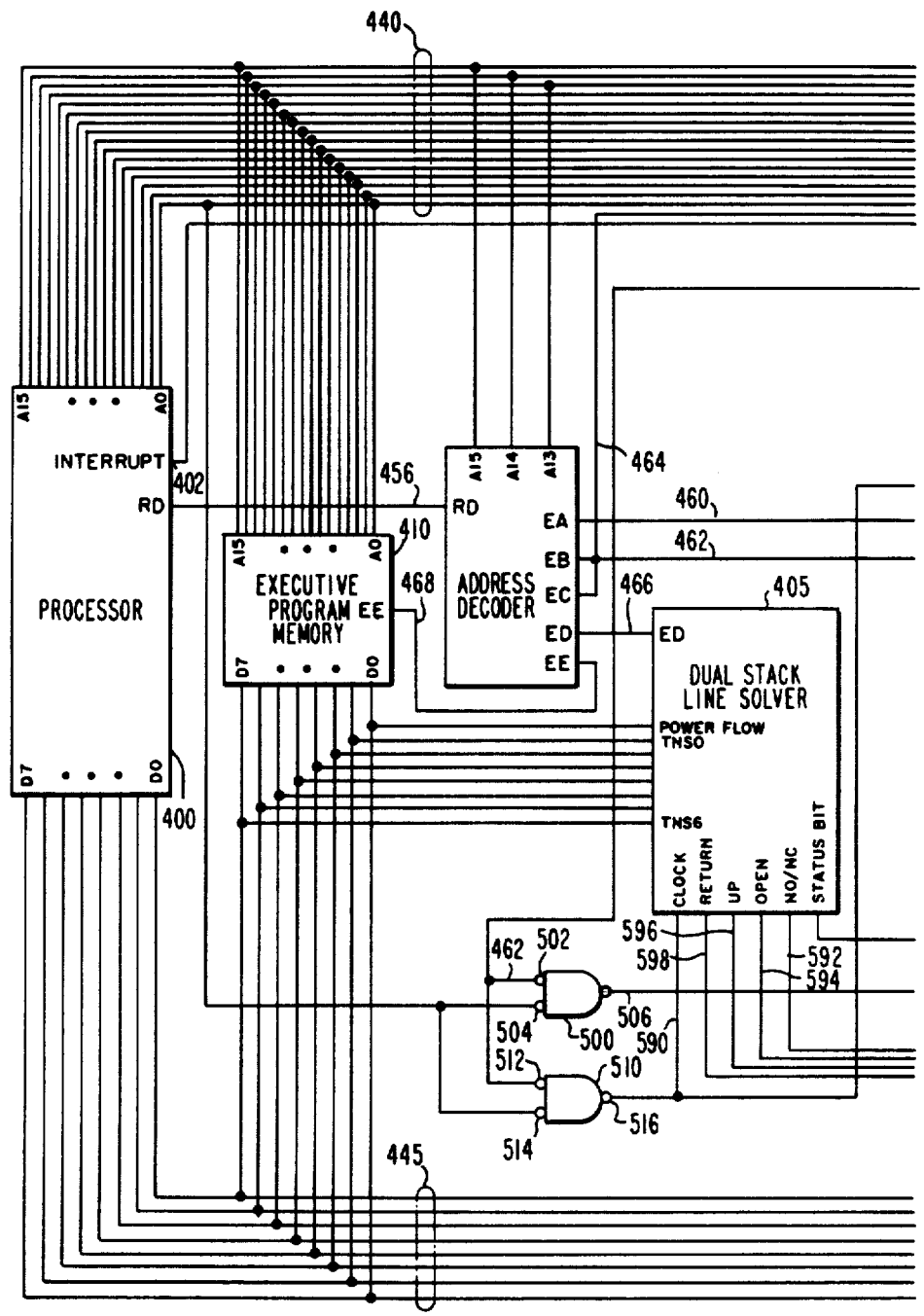
FIGS. 11A and 11B illustrate an 8-bit embodiment of the present invention.
Figure 11B:
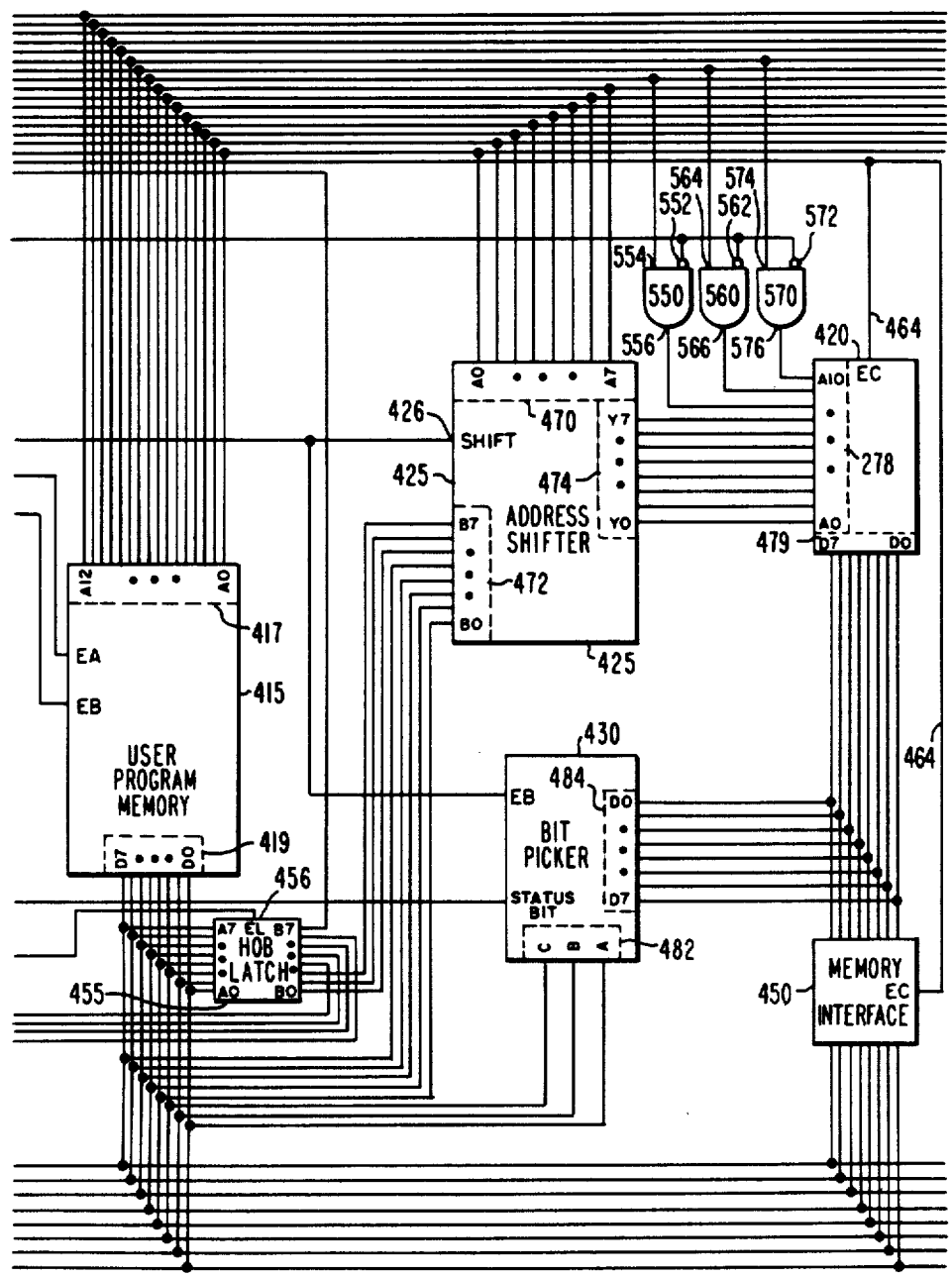

FIGS. 11A and 11B represent a schematic representation of the 8 bit implementation of the present invention. The system comprises a processor 400, a dual stack line solver 405, an executive program memory 410, a user program memory 415, an i/o image memory 420, an address shifter 425, a bit picker 430, a 16 line address bus 440, and 8 line data bus 445, a memory interface 450, and a high order byte latch (HOB Latch) 455. The 8 bit implementation is substantially similar to the 16 implementation with corresponding devices and having corresponding numbers. However, there are the following exceptions. The data maintained in the i/o image memory 420 is in the form of an 8 bit word. Similarly the data contained in the user program memory 415 is a 16 bit word stored as two 8 bit bytes—a high order byte and a low order byte. Because of this format for the user memory data word, the 8 bit HOB Latch 455, is required for retaining this data when it is read onto the data bus 445 from the data port 419 of the user program memory 415. The delay circuit of the enable EB line to the line solver is not required. Because the data is read from the user program memory 415 with the high order byte first, the status of the special function bit (on line D7 of the user program memory 415) can be determined prior to the reading of the low order byte.

The program element information contained in the high order byte is retained through the use of a HOB latch 455. The eight inputs lines of each of these latches is connected to the data bus 245. Selection of the latch is accomplished by decoding of the A0 address line of the address bus 440. At AND gate 500 EB 462 is connected to inverting input 502 with address line A0 connected to non-inverting input 504. Output 506 is connected to the enable inpout EL 456 of the HOB latch 455. When EB 462 is active low and A0 is low, the low order byte is being addressed in the user program memory 415 and output 506 of AND gate 500 is low and the HOB latch 455 is not enabled. When EB is active low and A0 is high indicating the presence of the high order bit output 506 is active. When output 506 is active, the HOB latch 455 is enabled capturing the HOB on the data bus 445. Thus A0 acts as a toggle between the high order byte and the low order byte of the ladder diagram element being read from the user program memory. AND gate 510 has ENABLE B 462 connected to inverting input 512 with address line A0 connected to the non-inverting input 514. The output 516 of AND gate 510 is provided to the shift input 426 of the address shifter 425 and the clock input 490 of the dual stack line solver 405. This insures that neither of these devices operates until the low order byte has been read from the user program memory 415. The outputs 506 and 516 are inverting outputs because of the active low convention that is used.

The outputs B3-B6 of the HOB latch 455 represent the contact attribute data and are connected directly to the corresponding inputs on a dual stack line solver. These are NONC-592, OPEN 594, UP 596, and RETURN 598, respectively. The B7 output of HOB latch 455 representing the special function bit is connected to the interrupt input 402 of the processor. The remaining lines B0–B2 of the high byte latch are provided to the B input port 472 of the address shifter 425. For the lower order byte, the three low order bits D0D2 of data port 419 are connected to the select lines A,B,C, respectively, of the input select 482 of the bit picker 430 with the remaining five upper order bits B3–B7 being connected to the B0–B4 lines of the port B472 of the address shifter 425. Thus the address appearing at the address shifter equivalent to lines D3–D10 of the 16 bit implementation. Because the i/o status is stored in an eight bit form, the address shifter 425 need only select between two 8 bit address. The address at port B 472 has previously been described. The address at port A 470 has eight lines A0–A7 that are connected to lines A0–A7 of the address bus 440. When EB 462 is active and the lower order byte has been read, the shift input 426 is active and the B port address is provided to the Y port output 474. In other cases the port A 470 address is outputted to the i/o image memory 420.

At the i/o image memory 420 the address port 478 is composed of the 8 bit address from the address shifter 425 provided via the 8 line data bus 457 plus a 3 bit address decoded from the address lines A8–A10 of the address bus 440 via the AND gates 550, 560 and 570 respectively. The inverting inputs 552, 562 and 572 of AND gates 550, 560 and 570 respectively are tied to EB 462. Address line A8 is provided to the non-inverting input 554 of AND gate 550. Address line A9 is tied to non-inverting input 564 of AND gate 560 with address line A10 being tied to non-inverting input 574 of AND gate 570. When EB 462 is active low, the outputs 556, 566 and 576 of the gates 550, 560 and 570 respectively will follow the data appearing on the 3 address lines A8–A10. With this scheme the bit addressing mode to the i/o image memory 420 is implemented only during logic solving.

The address decoder 435 serves substantially the same function in the 8 bit implementation as in the 16 bit version. Again the various components each have an ENABLE input allowing them to be accessed without affecting logic solving. These are EA 460 to the user program memory 415; EB 462 previously described; EC 464 to the i/o image memory 420 and the memory interface 450; ED 466 to the dual stack line solver 405; and EE 468 to the executive program memory. The dual stack line solver 405 is also substantially the same however, there is one less two node stack output due to the 8 bit data bus. With the 8 bit version only three select lines (A,B,C) are needed at the bit picker 430 to select the proper status bit as these three lines can be used to select which one of the eight combinations is the status bit corresponding to the ladder diagram element read from the user program memory 415. In comparison the 16 bit version utilized lines D0–D4 to generate 16 combinations.

Figure 12:
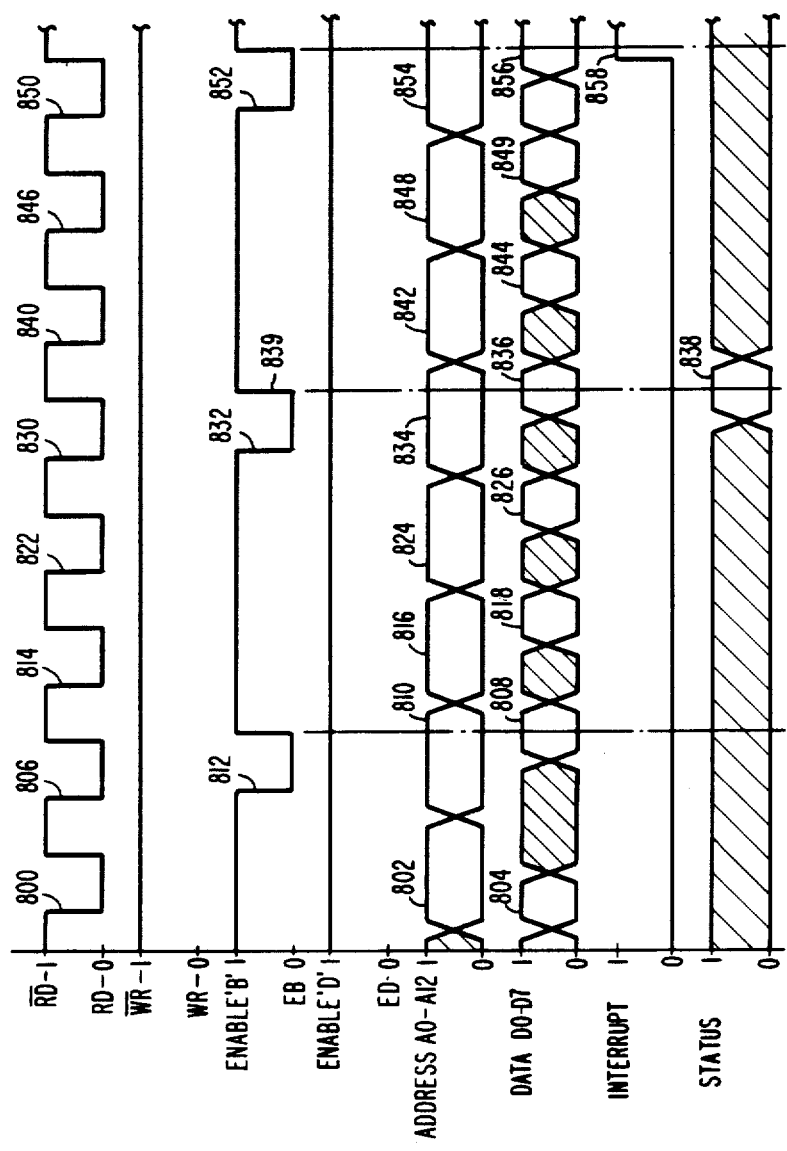
FIG. 12 is a timing diagram for the embodiment shown in FIGS. 11A and 11B during a block move instruction.

FIG. 12 illustrates the timing diagram for the 8 bit implementation of the invention. In general, the sequence of steps for the 8 bit embodiment are as follows:

| Step | Instruction |
|---|---|
| 1 | Move the high order byte of ladder diagram word from user program memory into the accumulator of the processor |
| 2 | Decrement the user program memory address by one |
| 3 | Move the low order byte of the ladder diagram word from user program memory into the accumulator of the processor |
| 4 | Decrement the user program memory address by one |

Step 1 occurs during the events designated 800–812. Step 2 occurs during the events designated 814–818. Step 3 occurs during the events designated 822–839 while step 4 occurs during the events designated 840–849. This sequence of steps is continuously executed until a word having the special function bit set is moved on the high order byte transfer which generates the interrupt. The occurrence of the interrupt is shown by the events designated 850–858.

Following the interrupt the processor performs substantially the same sequence of steps as in the 16 bit embodiment. The processor determines the coil status based on the results contained in the line solver and writes the coil status to the i/o image memory.

At the read event at 800, the processor reads the address at 802 and the opcode on the data bus at 804 provided by the executive program memory for starting the block move. During the read cycle at 806 the processor temporarily moves the high order byte at 808 of the ladder diagram element given by the address at 810 from the user program memory 415 into the accumulator of the processor 400 and into the address at 810 that also is decoded by the address decoder to activate the EB at 812. During read events 814 and 822 the processor is executing the opcodes for decrementing the present address and fetching the next memory data word. The address at 816 and the data at 818 represent the decrement instruction with address at 824 and the data at 826 representing the move instruction. At the read at 830, EB at 832 is active low when the address at 834 is decoded. The low order byte data is present on the data bus at 836. This also allows the i/o image memory to be accessed to obtain the corresponding status bit for the element at 838. When EB transitions at 839, the line solver is clocked to determine the power flow status of the contact. The events at 840–849 correspond to the events 814–826, respectively. During the read event at 850, EB is active after being decoded from the address at 854. The data at 856 is the high order byte having the special function bit set. The presence of the special function bit on the data bus generates the interrupt at 858. After i/o image memory updating if this is the end of the rung or after i/o card updating if this is the end of the program, the interrupt terminates and the scanning of the reference ladder continues or begins anew.

With either the 16 bit implementation or the 8 bit implementation the processor does not do anything with the contact data that it reads from the user program memory. The processor only provides a means by which the contact data is accessed from user memory so that the dual stack line solver can read it. Because the processor is not used to solve contact type elements it does not have to decide when to stop solving logic and when to service the inputs and outputs. The interrupt generated by the noncontact type elements automatically stops the logic solving process of the dual stack line solver allowing the processor to provide its decisional making capabilities when necessary.

With either implementation the preferred means for storing the user program memory in the i/o image memory is with the use of RAM chips. Also other means for generating the logic to enable the latches, shifters and other devices may also be employed. The terms line solver, dual stack line solver and contact solver are used interchangeably. Other embodiments of the invention will be apparent to those skilled in the art from a consideration of the specification or practice of the invention disclosed herein. It is intended that the specification be considered as exemplary only with the true scope and spirit of the invention being indicated by the following claims.

I claim:

1. A programmable controller for solving a ladder diagram having contact elements and noncontact elements and including a processor for controlling the functioning thereof and for utilizing the noncontact elements to provide a solution related to the ladder diagram, comprising:

memory means for storing the elements of the ladder diagram in a representative form and for storing a status corresponding to each element of the ladder diagram in a representative form;

ladder diagram contact solving means interconnected with the processor and the memory means for utilizing the contact elements of the ladder diagram and the corresponding contact element status stored in the memory means for providing an output related to the solution of the ladder diagram to the processor by solving the contact elements of the ladder diagram independently of the processor;

element read means for continuously reading each element of the rung of the ladder diagram and the corresponding status thereof from the memory means and transferring the read element and status to the ladder diagram contact solving means;

means for enabling the ladder diagram contact solving means whenever a contact element and corresponding status have been read from the memory means; and noncontact element sensing means for sensing noncontact elements that have been read from the memory means, upon sensing of a noncontact element, the noncontact element sensing means:

inhibiting operation of the element read means;

inhibiting the ladder diagram contact solving means from solving the read noncontact element and its corresponding status; and actuating the processor to solve the sensed noncontact element.

2. The apparatus of claim 1 wherein the memory means comprises a digital RAM memory of N words having X bits per word.

3. The apparatus of claim 2 wherein X=16.

4. The apparatus of claim 2 wherein the ladder diagram contact solving means is a digital dual stack line solver.

5. A programmable controller for solving a ladder diagram having contact elements and noncontact elements and including a processor for controlling the functioning thereof and for utilizing the noncontact elements to provide a solution related to the ladder diagram, comprising:

user memory means for storing the elements of the ladder diagram in a representative form;

i/o memory means for storing a status corresponding to each element of the ladder diagram in a representative form;

ladder diagram contact solving means interconnected with the processor, the user memory means, and the i/o memory means for utilizing the contact elements of the ladder diagram stored in the user memory means and the corresponding contact element status stored in the i/o memory means for providing an output related to the solution of the ladder diagram to the processor by solving the contact elements of the ladder diagram independently of the processor thereby decreasing the time required to arrive at the solution for the ladder diagram;

element read means for continuously reading each element of the rung of the ladder diagram from the user memory means and the corresponding status thereof from the i/o memory means and transferring the read element and status to the ladder diagram contact solving means;

means for enabling the ladder diagram contact solving means whenever a contact element and corresponding status have been read from the user memory means and the i/o memory means, respectively; and noncontact element sensing means for sensing noncontact elements that have been read from the user memory means, upon sensing of a noncontact element, the noncontact element sensing means:

inhibiting operation of the element read means;

inhibiting the ladder diagram contact solving means from solving the read noncontact element and its corresponding status; and actuating the processor to solve the read noncontact element.

6. The apparatus of claim 5 wherein the user memory means and the i/o memory means each comprise a digital RAM memory of N words and M words, respectively, the N words and M words each having X bits per word.

7. The apparatus of claim 6 wherein X=16.

8. The apparatus of claim 6 wherein X=8.

9. The apparatus of claim 6 wherein the ladder diagram contact solving means is a digital dual stack line solver.

10. A programmable controller for solving a ladder diagram having contact elements and noncontact elements and including a processor for controlling the functioning thereof and for utilizing the noncontact elements to provide a solution related to the ladder diagram, comprising:

user memory means for storing the elements of the ladder diagram in a representative form;

i/c memory means for storing a status corresponding to each element of the ladder diagram in a representative form, the user memory means and the i/o memory means each comprising a digital RAM memory of N words and M words, respectively, the N words and M words each having 16 bits per word;

dual stack line solver means interconnected with the processor, the user memory means, and the i/o memory means for utilizing the contact elements of the ladder diagram stored in the user memory means and the corresponding contact element status stored in the i/o memory means for providing an output related to the solution of the ladder diagram to the processor by solving the contact elements of the ladder diagram independently of the processor thereby decreasing the time required to arrive at the solution for the ladder diagram;

element read means for continuously reading each element of the rung of the ladder diagram from the user memory means and the corresponding status thereof from the i/o memory means and transferring the read element and status to the dual stack line solver means;

means for enabling the dual stack line solver means whenever a contact element and corresponding status have been read from the user memory means and the i/o memory means, respectively; and noncontact element sensing means for sensing noncontact elements that have been read from the user memory, upon sensing of a noncontact element, the noncontact element sensing means;

inhibiting operation of the element read means;

inhibiting the dual stack line solver means from solving the read noncontact element and its corresponding status; and actuating the processor to solve the read noncontact element.

11. The apparatus of claim 10 wherein the representative form of the element comprises 16 data bits having a 5 bit element attribute portion and an 11 bit reference number portion, the attribute portion defining the type and attributes of the element with the reference portion identifying the element in the ladder diagram.

12. A programmable controller for solving a ladder diagram having contact elements and noncontact elements and including a processor for controlling the functioning thereof and for utilizing the noncontact elements to provide a solution related to the ladder diagram, comprising:

memory means for storing the elements of the ladder diagram in a representative form and for storing a status corresponding to each element of the ladder diagram in a representative form;

ladder diagram contact solving means interconnected with the processor and the memory means for utilizing the contact elements of the ladder diagram and the corresponding contact element status stored in the memory means for providing an output related to the solution of the ladder diagram to the processor by solving the contact elements of the ladder diagram independently of the processor thereby decreasing the time required to arrive at the solution for the ladder diagram;

element read means for continuously reading each element of the rung of the ladder diagram and the corresponding status thereof from the memory means and transferring the read element and status to the ladder diagram contact solving means;

means for enabling the ladder diagram contact solving means whenever a contact element and corresponding status have been selected from the memory means; and noncontact element sensing means for sensing noncontact elements that have been read from the memory means, upon the sensing of a noncontact element, the noncontact element sensing means;

inhibiting operation of the element read means;

inhibiting the ladder diagram contact solving means from solving the read noncontact element and its corresponding status; and actuating the processor to solve the sensed noncontact element.

13. The apparatus of claim 12 wherein the memory means comprises a digital RAM memory of N words having X bits per word.

14. The apparatus of claim 13 wherein $X = 16$.

15. The apparatus of claim 13 wherein the ladder diagram contact solving means is a digital dual stack line solver.

* * * * *